United States Patent
Karakis

(10) Patent No.: US 8,315,670 B2
(45) Date of Patent: Nov. 20, 2012

(54) BASE STATION ANTENNA INTERFACE SYSTEM FOR ANTENNA CABLE REDUCTION IN DUAL BAND DEPLOYMENTS

(75) Inventor: John G. Karakis, Scotch Plains, NJ (US)

(73) Assignee: Alcatel Lucent, Paris (FR)

( * ) Notice: Subject to any disclaimer, the term of this patent is extended or adjusted under 35 U.S.C. 154(b) by 1076 days.

(21) Appl. No.: 12/008,017

(22) Filed: Jan. 8, 2008

(65) Prior Publication Data

US 2009/0176470 A1 Jul. 9, 2009

(51) Int. Cl.
*H04M 1/00* (2006.01)

(52) U.S. Cl. .......... 455/562.1; 455/272; 455/552.1; 455/88; 455/275

(58) Field of Classification Search .......... 455/562.1, 455/272, 552.1, 88, 168, 275, 553.1
See application file for complete search history.

(56) References Cited

U.S. PATENT DOCUMENTS

2005/0136875 A1* 6/2005 Skarby et al. .......... 455/306
2005/0227631 A1* 10/2005 Robinett .......... 455/83
* cited by examiner

*Primary Examiner* — Ariel Balaoing
(74) *Attorney, Agent, or Firm* — McCormick, Paulding & Huber LLP

(57) ABSTRACT

In an antenna interface system of a wireless network base station, each sector of the base station is outfitted with two dual-band duplexer assemblies, each of which includes a tower-mounted antenna unit, an RF filter unit (e.g., triplexer), and an RF feed or antenna cable that interconnects the two. One antenna unit transmits in one communication band, and the other transmits in a second band. Both units receive signals over the two bands. The RF filter units pass transmit data on to the cables and filter receive data of both bands for separate output. The antenna units and filter units act as cable-end interfaces for multiplexing and de-multiplexing the transmit and receive data on and off the cables. Thus, each cable carries transmit data for one communication band and receive data for both bands, for a total of two cables per sector for dual-band applications.

19 Claims, 3 Drawing Sheets

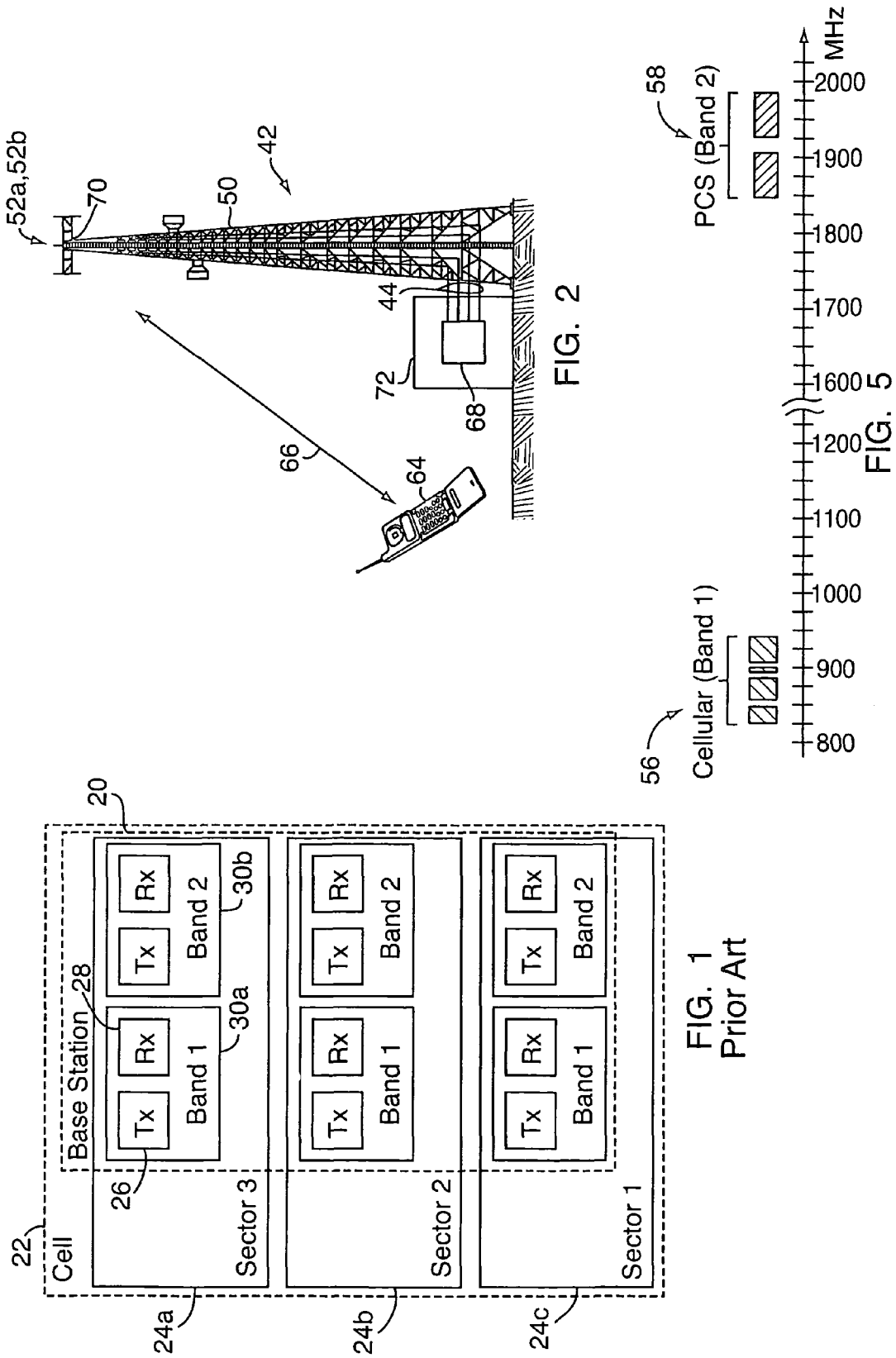

BASE STATION ANTENNA INTERFACE SYSTEM FOR ANTENNA CABLE REDUCTION IN DUAL BAND DEPLOYMENTS

FIELD OF THE INVENTION

The present invention relates to radio-frequency (RF) communications and, more particularly, to antennas and antenna interfaces in a wireless network base station.

BACKGROUND OF THE INVENTION

In a typical radio frequency ("RF") communication network, the geographic area covered by the network is divided into a number of contiguous cells, each serviced by a stationary base station, and/or into sectors, which are portions of a cell typically serviced by different antennae/receivers supported on a single base station, e.g., a 60° or 120° "slice" of a cell. Data and other signals are transmitted from the base stations to various distributed mobile phones and other wireless units, which are carried by the network's users for accessing network communication services such as voice and non-voice data transfer. As the number of wireless users has increased (thereby increasing network load), and as commercial wireless and networking technologies have increased in sophistication and complexity (e.g., multiple antennas for diversity and/or beamforming purposes), network service providers have sought to increase the number of antennas and other equipment carried on each base station tower. This is problematic, however, in that base stations are limited in terms of the number of RF feed cables that can be run up the tower.

To explain further, in modern wireless systems one of the most severe limitations imposed on adaptive antenna arrays and other tower-based RF equipment is the number of RF feed cables per base station. Since tower top transceiver electronics are uncommon, antennas are typically connected to the base station electronics (e.g., housed at ground level in a building, cabinet, or other enclosure) by way of large-diameter, low-loss RF feed/antenna cables. For example, as shown in FIG. 1, in a typical dual-band base station architecture (where the base station 20 supports one cell 22 divided into three sectors 24a-24c) there are twelve antenna cables: a transmit antenna 26 and a receive antenna 28 for each communication band 30a, 30b in each sector 24a-24c. These cables impose significant weight and wind loading on the base station tower.

SUMMARY OF THE INVENTION

An embodiment of the present invention relates to an antenna interface system for a wireless network base station, which reduces the number of RF feed or antenna cables required for dual-band applications. ("Dual-band" refers to wireless communications over first and second communication bands. "Communication band" refers to a designated, logically distinct, contiguous or non-contiguous grouping of radio frequencies, i.e., a designated RF bandwidth, used for signal transmission and reception in a communication system.) In the system, each sector of the base station is outfitted with two dual-band duplexer assemblies or units. Each dual-band duplexer unit includes a tower-mounted antenna unit, an RF triplexer or other filter unit, and an RF feed or antenna cable that extends up the base station tower for interconnecting the two. One antenna unit is configured to transmit signals over a first communication band, and the other antenna unit is configured to transmit signals over a second communication band. Both antenna units receive signals over both the first band and the second band. The RF filter units pass the transmit data on to the cables and filter the receive data of both bands for separate output. (In this context, "filter" generally refers to processing the dual-band receive data carried over an antenna cable so that the receive data of each band is routed to a separate output in a form suitable for further processing by a base station radio controller or other circuitry.) Thus, each antenna cable carries transmit data for one communication band and receive data for both bands. (The term "receive data" refers to data signals that are received over an air interface, and the term "transmit data" refers to data signals that are designated for transmission over an air interface.)

In another embodiment, therefore, instead of having separate transmit and receive antenna cables for each communication band in each sector for a dual-band application (for a total of four cables per sector), there are only two antenna cables per sector. The first cable carries transmit data for the first band, and the second cable carries transmit data for the second band. Both cables carry receive data for both bands. The antenna units and filter units act as cable-end interfaces for multiplexing and de-multiplexing the transmit and receive data onto and off of the antenna cables. For a three-sector base station, which is a common configuration, the antenna interface system reduces the total number of antenna cables from twelve to six, for dual-band operation.

In another embodiment, the RF filter units are housed in a base station enclosure, typically at ground level, along with the other base station electronics. Each filter unit is a triplexer-type device that includes a transmit filter sub-unit and first and second receive filter sub-units. The transmit filter sub-unit has an output directly or indirectly attached to one of the antenna cables, and is configured to pass transmit data to the antenna cable, e.g., to multiplex the transmit data onto the cable. (The transmit data is received from the base station controller or other base station electronics.) The first filter sub-unit includes a filter circuit and a low noise amplifier, and has an input attached to the cable. The receive data of both bands is present at the input, as received over the cable. The filter circuit separates the receive data of the first band from the receive data of the second band. The receive data of the first band is then amplified by the low noise amplifier. The second filter sub-unit is similarly configured, but for the receive data of the second band.

In another embodiment, each tower-top antenna unit includes two antennas, one for receiving data over one of the communication bands and another that both receives and transmits data over the other communication band. As should be appreciated, this configuration results in two receive antennas for each communication band, for diversity reception purposes. The two antennas are interconnected to one of the antenna cables by a tower mounted amplifier unit, a diplexer, or the like. In alternative embodiments, dual-band antennas are used instead of band-specific antennas.

BRIEF DESCRIPTION OF THE DRAWINGS

The present invention will be better understood from reading the following description of non-limiting embodiments, with reference to the attached drawings, wherein "Tx" and "Rx" refer to transmission and reception, respectively, and wherein below:

FIG. 1 is a schematic diagram of the transmit and receive antenna cables of a three-sector base station configured for dual-band communications, according to the prior art;

FIG. 2 is a schematic view of a wireless network base station and antenna tower;

FIG. 5 is a graph showing the RF frequency spectrum for two exemplary communication bands.

DETAILED DESCRIPTION

Figure 3:
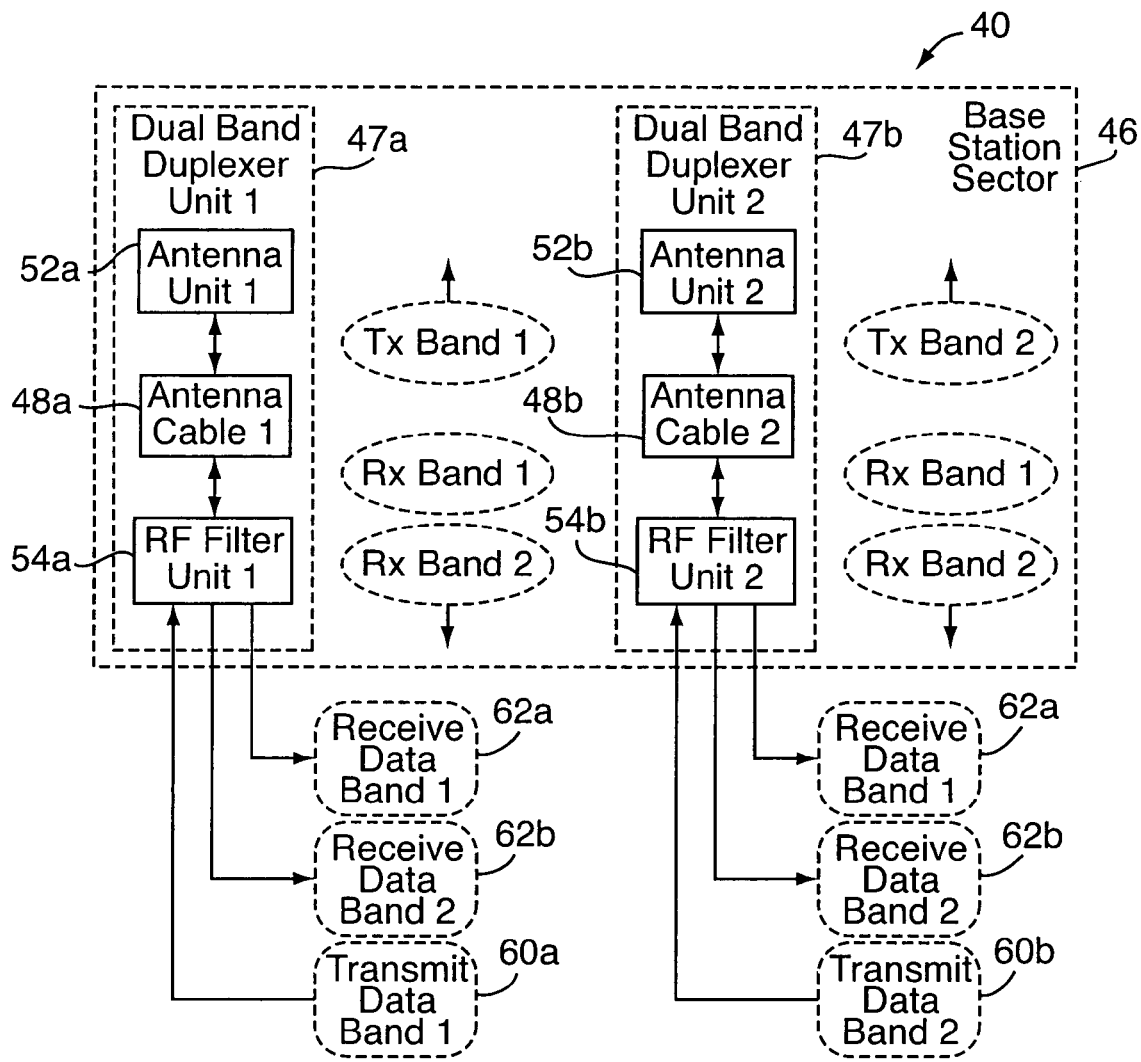
FIG. 3 is a schematic view of an antenna interface system for a wireless network base station, according to an embodiment of the present invention.

With reference to FIGS. 2-5 an embodiment of the present invention relates to an antenna interface system 40 for a wireless network base station 42, which reduces the number of RF feed or antenna cables 44 required for dual-band applications. In the system 40, each sector 46 of the base station is outfitted with two dual-band duplexer assemblies/units 47a, 47b. Each dual-band duplexer unit 47a, 47b includes an RF feed or antenna cable 48a, 48b, a tower-mounted antenna unit 52a, 52b, and an RF triplexer or other filter unit 54a, 54b. The cable 48a, 48b is routed up a base station tower or other elevated support 50, and interconnects the antenna unit 52a, 52b and the RF filter unit 54a, 54b. One antenna unit 52a is configured to transmit over a first communication band 56 and to receive signals over both the first band 56 and a second communication band 58. The other antenna unit 52b is configured to transmit over the second band and to receive signals over both bands. The first cable 48a carries transmit data 60a for the first band 56, the second cable 48b carries transmit data 60b for the second band 58, and both cables carry receive data 62a, 62b for both bands 56, 58. The RF filter units 54a, 54b pass the transmit data 60a, 60b on to the cables 48a, 48b and filter the receive data 62a, 62b of both bands for separate output.

Under this configuration, the antenna units 52a, 52b and filter units 54a, 54b act as cable-end interfaces for multiplexing the transmit and receive data onto the cables and for de-multiplexing the transmit and receive data off the cables. Each cable 48a, 48b carries the transmit data of one of the bands 56, 58 and receive data for both bands. Thus, instead of having separate transmit and receive antenna cables for each communication band in each sector (for a total of four cables per sector), there are only two antenna cables 48a, 48b per sector 46. For a three-sector base station, the antenna interface system 40 reduces the total number of antenna cables from twelve to six, for dual-band operation.

The antenna interface system 40 is typically deployed as part of the equipment used for carrying out communications in a wireless communication network, such as in a cellular network where RF signals are transmitted between various wireless units 64 and one or more fixed base stations 42 over an air interface 66. (In mobile communications, an "air interface" is the radio-based communication link between the wireless units and the base stations. Thus, as noted above, the terms "receive data" and "transmit data" refer to data signals received over an air interface and designated for transmission over an air interface, respectively.) The wireless units 40 may include, for example, mobile phones, wireless PDA's, wireless devices with high-speed data transfer capabilities, such as those compliant with "3-G" or "4-G" standards, "WiFi"-equipped computer terminals, and the like. The base station 42 is provided with a base station controller 68, which includes various transceivers and other electronics for radio communications with the wireless units 64 over the air interface 66. The base station 42 will typically be connected by way of a high-speed land line to a radio network controller and/or mobile switching center (not shown), which coordinates data transfer between the network's various base stations and the rest of the network. For example, the network may further include a core packet data network (e.g., a private IP network and/or the Internet) and/or connectivity to a public switched telephone network.

The antenna interface system 40 is used for dual-band applications. As noted above, "dual-band" refers to wireless communications over first and second logically distinct communication bands 56, 58, each of which comprises a range of radio frequencies used for radio signal transmission and reception in a particular application. (In other words, in a dual-band system, the first band comprises a first designated range of frequencies designated for transmitting and receiving data, e.g., a first air interface, and the second band comprises a second, logically distinct designated range of frequencies designated for transmitting and receiving data, e.g., a second air interface.) The frequency bandwidths of each band 56, 58 may or may not be contiguous. As such, when it is referred to herein that an antenna (or other element) transmits and receives data over a particular communication band, this encompasses the possibilities of both full-duplex and half-duplex communications, and does not mean that the transmit data and receive data necessarily travel over the same frequencies. As one example, the communication bands 56, 58 could be the Cellular/850 and PCS bands, the frequency ranges of which are illustrated (in approximation) in FIG. 5. However, the system 40 may be used in any dual-band application, and is not limited for use with PCS and Cellular/850.

With reference to FIG. 2, the antenna units 52a, 52b will typically be mechanically connected to a platform 70 at the top of a base station tower 50. The platform 70 is coupled to the tower 50, which elevates the antenna units 52a, 52b above surrounding buildings and other obstructions. Communication signals (e.g., the transmit and receive data) are transferred between the base station controller 68 and the antenna units 52a, 52b by way of the antenna cables 44, which are connected to and routed up the tower 50. The base station controller 68, RF filter units 54a, 54b, and other base station electronics are housed in a base station enclosure 72, which is a cabinet, hut, building, or other secure, weatherproof area suitable for safely housing electronic devices. Typically, the enclosure 72 is located at ground level.

Figure 4:
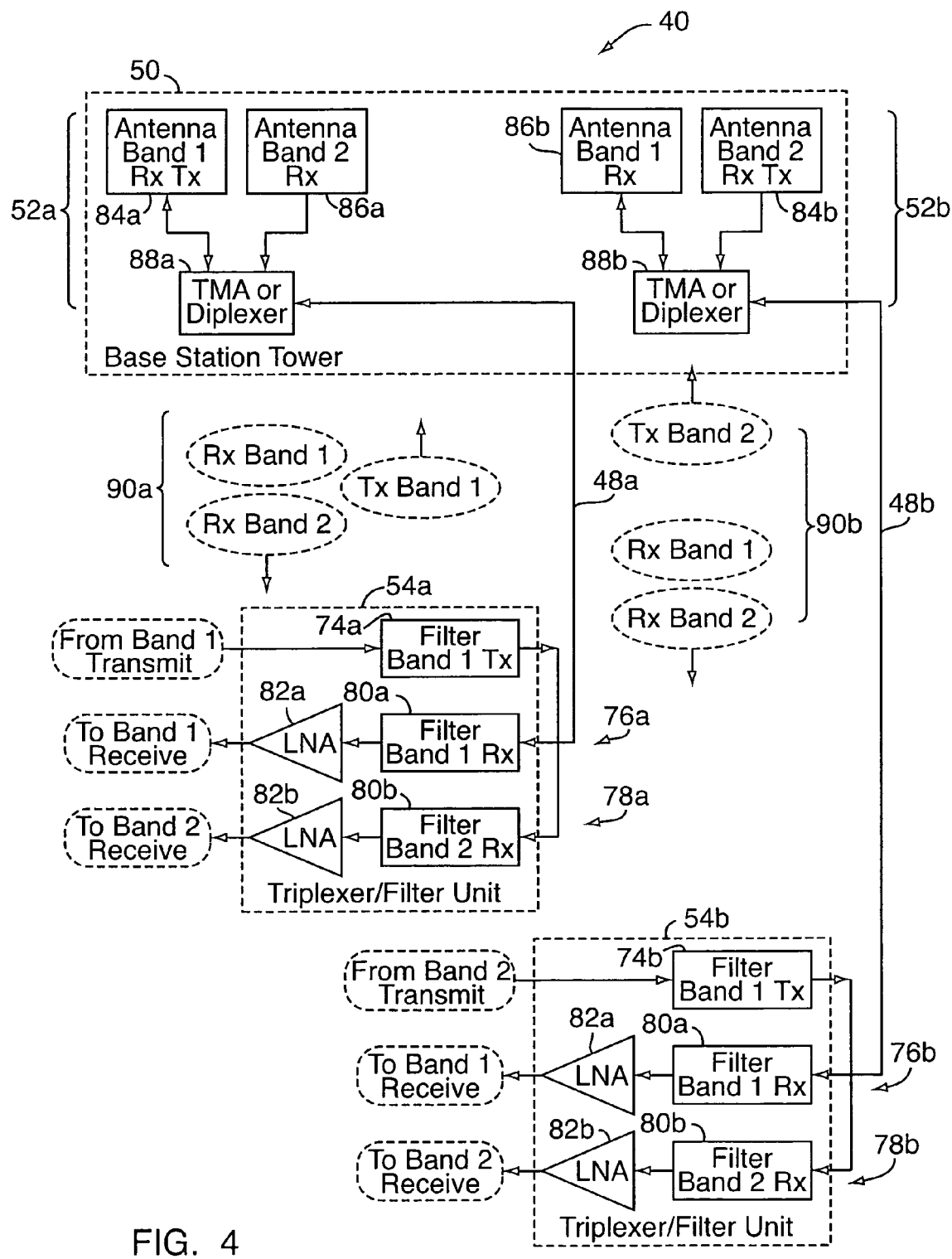
FIG. 4 is a more detailed view of the system shown in FIG. 3, according to another embodiment of the present invention.

With reference to FIGS. 3 and 4, each RF filter unit 54a, 54b is a triplexer-type device that includes a transmit filter sub-unit 74a, 74b, a first receive filter sub-unit 76a, 76b, and a second receive filter sub-unit 78a, 78b. The transmit filter sub-unit 74a, 74b has an output directly or indirectly attached to one of the antenna cables 48a, 48b. The transmit filter sub-unit 74a, 74b is configured to accept band-specific transmit data at an input (e.g., as received from the base station controller 68) and to process it as needed for transfer over the antenna cable. Thus, the transmit filter sub-unit 74a of one of the RF filter units 54a is configured to pass transmit data 60a of the first communication band 56 (for example) on to the first antenna cable 48a, and the transmit filter sub-unit 74b of the other RF filter unit 54b is configured to pass transmit data 60b of the second communication band 58 on to the second antenna cable 48b. The transmit filter sub-units may be bandpass filters with associated support circuitry.

In each RF filter unit 54a, 54b, the first filter sub-unit 76a, 76b includes a filter circuit 80a (e.g., a bandpass filter circuit) and a low noise amplifier ("LNA") 82a. The second filter sub-unit 78a, 78b also includes a filter circuit 80b and a low noise amplifier 82b. The filter circuits 80a, 80b each have an input attached to one of the cables 48a, 48b. The filter 80a of one of the filter sub-units 76a, 76b is configured to process the receive data of the first band 56. The filter 80b of the other filter sub-unit 78a, 78b is configured to process the receive data of the second band 58. In operation, it is contemplated that the receive data 62a, 62b of both bands 56, 58 may be present on a cable 48a, 48b. The two filter sub-units 76a, 78a split the receive data signals 62a, 62b present on the cable, and each is outputted as a separate signal for further processing by the base station controller 68. The low noise amplifiers 82a, 82b serve to amplify the separated receive data signals for transfer to the base station controller 68 or other electronics.

Turning now to the tower-top antenna units 52a, 52b, the first antenna unit 52a includes two antennas 84a, 86a. The first antenna 84a is configured to receive data 62a over the first communication band 56, and to transmit data 60a over the first band 56. (In other words, the first antenna is configured to both transmit and receive data over the first band.) The second antenna 86a is configured to receive data 62b over the second communication band 58. The two antennas 86a, 86b are connected to a tower mounted amplifier ("TMA") and/or diplexer unit 88a, which is in turn connected to the antenna cable 48a. The diplexer unit 88a combines the receive data 62a, 62b from both antennas into a single output, for transfer over the antenna cable 48a.

The second antenna unit 52b is similarly configured, and includes first and second antennas 84b, 86b and a TMA/diplexer unit 88b. Here, however, the first antenna 84b is configured to transmit and receive data over the second communication band 58, and the second antenna 86b is configured to receive data over the first communication band 56.

In combination, the two antenna units 52a, 52b present one transmit antenna and two receive antennas for each communication band 56, 58. The antenna units 52a, 52b are spaced apart on the tower platform by a designated distance, which is typically a function the RF wavelengths received at the antennas. The two spaced-apart receive antennas for each band allow for diversity reception. The base station controller may be configured to process the data received at the two receive antennas of each band in a manner appropriate for diversity reception, as is known in the art.

As discussed above, the circuits shown in FIGS. 3 and 4 are implemented on a per-sector basis, e.g., each sector of a base station is outfitted with two dual-band duplexer units 47a, 47b, each of which includes: an antenna unit 52a, 52b; an RF filter unit 54a, 54b; and an RF feed or antenna cable 48a, 48b that interconnects the two. Since the two cables 48a, 48b carry transmit and receive data for both bands, only two cables are required for a dual-band implementation, per sector. Thus, for a three-sector base station, for example, there are a total of six antenna cables extending up the base station tower 50.

The transmit and receive data signals carried over an antenna 48a, 48b can be considered to form a composite signal, that is, the signals are present on a single conductor/conductor system, and are not separated for transfer over separate conductive paths. In operation, therefore, an embodiment of the system 40 can be characterized as involving the transfer of first and second composite RF signals 90a, 90b over the first and second antenna cables 48a, 48b, respectively. (The first cable 48a interconnects the first antenna unit 52a and the first RF filter unit 54a, and the second cable interconnects the second antenna unit 52b and the second RF filter unit 54b.) The first composite signal 90a includes transmit data 60a of the first band 56, and receive data 62a, 62b of both bands. The second composite signal 90b includes transmit data 60b of the second band 58, and receive data 62a, 62b of both bands. (See FIG. 3.) In the first RF filter unit 54a, the transmit data 60a of the first band 56 (as received from the base station controller) is passed on to the first cable 48a. The receive data 62a, 62b that arrives over the first cable 48a is split or otherwise filtered so that each receive data signal is separately presented at a different output, for further processing by the base station controller. In the second RF filter unit 54b, the transmit data 60b of the second band 58 (as received from the base station controller) is passed on to the second cable 48b. The receive data 62a, 62b that arrives over the second cable 48b is split or otherwise filtered so that each receive data signal is separately presented at a different output, for further processing by the base station controller.

Similarly, in the first antenna unit 52a, the data signals 62a, 62b received over the two bands (at the first and second antennas 84a, 86a, respectively) are combined or multiplexed for transfer over the first cable 48a. The transmit data 60a received over the cable 48a is routed to the first band transmit/receive antenna 84a for transmission over the first communication band air interface. In the second antenna unit 52b, the data signals 62a, 62b received over the two bands (at the two antennas 86b, 84b, respectively) are combined or multiplexed for transfer over the second cable 48b. The transmit data 60b received over the cable 48b is routed to the second band transmit/receive antenna 84b for transmission over the second communication band air interface.

The antenna units 52a, 52b and filter units 54a, 54b may be implemented using standard RF electronic modules and components, according to standard design principles as known to those skilled in the art.

As noted above, instead of using two band-specific antennas 84a, 86a in each antenna unit 52a, dual-band antennas may be used instead, without departing from the spirit and scope of the invention.

Since certain changes may be made in the above-described base station antenna interface system for antenna cable reduction in dual band deployments, without departing from the spirit and scope of the invention herein involved, it is intended that all of the subject matter of the above description or shown in the accompanying drawings shall be interpreted merely as examples illustrating the inventive concept herein and shall not be construed as limiting the invention.

I claim:

1. An antenna interface system for a base station, said system comprising:
   a first radio-frequency (RF) antenna unit configured for transmitting transmit data over a first communication band and for receiving receive data over the first band and receive data over a second communication band;
   a first antenna cable connected to the first antenna unit, said first antenna cable collectively carrying the transmit data of the first band and the receive data of the first and second bands, and said first antenna cable not carrying the transmit data of the second band;
   a first RF filter unit connected to the first antenna cable and configured to pass the transmit data of the first band on to the first antenna cable and to filter the receive data of the first band and the receive data of the second band collectively carried by the first antenna cable for separate output;
   a second RF antenna unit configured for transmitting transmit data over the second band and for receiving receive data over both the first and second bands;
   a second antenna cable connected to the second antenna unit, said second antenna cable collectively carrying the transmit data of the second band and the receive data of the first and second bands, and said second antenna cable not carrying the transmit data of the first band; and a second RF filter unit connected to the second antenna cable and configured to pass the transmit data of the second band on to the second antenna cable and to filter the receive data of the first band and the receive data of the second band collectively carried by the second antenna cable for separate output.

2. The system of claim 1 wherein each filter unit comprises:
a transmit filter sub-unit having an output attached to a respective one of the first and second cables and configured for passing a respective one of the transmit data of the first band and the transmit data of the second band on to said respective one of the first and second cables;
a first receive filter sub-unit comprising: a first receive filter circuit for filtering the receive data of the first band, said first receive filter circuit having an input connected to said respective one of the first and second cables; and a first low noise amplifier connected between an output of the first receive filter circuit and an output of the first receive filter sub-unit, for amplifying the receive data of the first band; and
a second receive filter sub-unit comprising: a second receive filter circuit for filtering the receive data of the second band, said second receive filter circuit having an input connected to said respective one of said first and second cables; and a second low noise amplifier connected between an output of second receive filter circuit and an output of the second receive filter sub-unit, for amplifying the receive data of the second band.

3. The system of claim 1 wherein:
the first and second antenna units are attached to a base station tower and the first and second filter units are located in a base station enclosure remote from the antenna units; and
the first and second cables extend from the first and second filter units up the tower to the first and second antenna units, respectively.

4. The system of claim 3 wherein each filter unit comprises:
a transmit filter sub-unit having an output attached to a respective one of the first and second cables and configured for passing a respective one of the transmit data of the first band and the transmit data of the second band on to said respective one of the first and second cables;
a first receive filter sub-unit comprising: a first receive filter circuit for filtering the receive data of the first band, said first receive filter circuit having an input connected to said respective one of the first and second cables; and a first low noise amplifier connected between an output of the first receive filter circuit and an output of the first receive filter sub-unit, for amplifying the receive data of the first band; and
a second receive filter sub-unit comprising: a second receive filter circuit for filtering the receive data of the second band, said second receive filter circuit having an input connected to said respective one of said first and second cables; and a second low noise amplifier connected between an output of second receive filter circuit and an output of the second receive filter sub-unit, for amplifying the receive data of the second band.

5. The system of claim 3 wherein:
the first antenna cable, first antenna, and first filter unit together form a first dual-band duplexer unit;
the second antenna cable, second antenna, and second filter unit together form a second dual-band duplexer unit;
the first and second dual-band duplexer units are deployed in a first sector of the base station; and
each of a second sector and third sector of the base station is outfitted with two dual-band duplexer units configured the same as the first and second dual-band duplexer units.

6. The system of claim 1 wherein the first and second communication bands are distinct RF bandwidths each designated for transmitting and receiving wireless signals.

7. The system of claim 6 wherein:
the first and second antenna units are attached to a base station tower and the first and second filter units are located in a base station enclosure remote from the antenna units; and
the first and second cables extend from the first and second filter units up the tower to the first and second antenna units, respectively.

8. The system of claim 7 wherein:
the first antenna cable, first antenna, and first filter unit together form a first dual-band duplexer unit;
the second antenna cable, second antenna, and second filter unit together form a second dual-band duplexer unit;
the first and second dual-band duplexer units are deployed in a first sector of the base station; and
each of a second sector and third sector of the base station is outfitted with two dual-band duplexer units configured the same as the first and second dual-band duplexer units.

9. The system of claim 6 wherein each filter unit comprises:
a transmit filter sub-unit having an output attached to a respective one of the first and second cables and configured for passing a respective one of the transmit data of the first band and the transmit data of the second band on to said respective one of the first and second cables;
a first receive filter sub-unit comprising: a first receive filter circuit for filtering the receive data of the first band, said first receive filter circuit having an input connected to said respective one of the first and second cables; and a first low noise amplifier connected between an output of the first receive filter circuit and an output of the first receive filter sub-unit, for amplifying the receive data of the first band; and
a second receive filter sub-unit comprising: a second receive filter circuit for filtering the receive data of the second band, said second receive filter circuit having an input connected to said respective one of said first and second cables; and a second low noise amplifier connected between an output of second receive filter circuit and an output of the second receive filter sub-unit, for amplifying the receive data of the second band.

10. The system of claim 1 wherein:
the first antenna unit includes a first antenna configured for transmitting transmit data and receiving receive data over the first band, a second antenna configured for receiving receive data over the second band, and at least one of a first diplexer unit and a first tower mounted amplifier (TMA) interconnecting the first and second antennas to the first antenna cable; and
the second antenna unit includes a third antenna configured for transmitting transmit data and receiving receive data over the second band, a fourth antenna configured for receiving receive data over the first band, and at least one of a second diplexer unit and a second TMA interconnecting the third and fourth antennas to the second antenna cable.

11. A method of processing radio frequency (RF) signals in a base station antenna system, said method comprising the steps of:

transferring first and second composite RF signals over first and second antenna cables, respectively, said first cable interconnecting a first antenna unit and a first RF filter unit and said second cable interconnecting a second antenna unit and a second RF filter unit, wherein the first and second composite signals include transmit data of only the first and second communication bands, respectively, and receive data of both the first band and the second band;

in the first filter unit, passing the transmit data of only the first band on to the first cable and filtering the receive data of the first and second bands collectively carried by the first cable for separate output; and in the second filter unit, passing the transmit data of only the second band on to the second cable and filtering the receive data of the first and second bands collectively carried by the second cable for separate output.

12. The method of claim 11 further comprising:

in the first antenna unit, combining the receive data of the first and second bands for transfer over the first cable, said receive data of the first band being received at a first antenna and said receive data of the second band being received at a second antenna, and transferring the transmit data of the first band to the first antenna for transmission over the first band; and in the second antenna unit, combining the receive data of the first and second bands for transfer over the second cable, said receive data of the first band being received at a third antenna and said receive data of the second band being received at a fourth antenna, and transferring the transmit data of the second band to the fourth antenna for transmission over the second band.

13. The method of claim 12 wherein the steps of the method are carried out separately in each of three base station sectors.

14. An antenna interface system for a base station operationally divided into a plurality of sectors, said system comprising, for each of said sectors:

a first dual-band duplexer unit comprising:
  a first radio-frequency (RF) antenna unit, a first RF filter unit, and a first antenna cable interconnecting the two;
  wherein the first antenna unit is configured for transmitting transmit data carried by the first antenna cable over a first communication band and for receiving receive data over both the first band and a second communication band, said receive data being multiplexed for collective transfer over the first antenna cable to the first RF filter unit; and
  wherein the first RF filter unit is configured to pass the transmit data of only the first communication band on to the first cable for transfer to the first antenna unit and to filter the receive data of the two bands, collectively carried by the first antenna cable, for separate output; and a second dual-band duplexer unit comprising:
  a second radio-frequency (RF) antenna unit, a second RF filter unit, and a second antenna cable interconnecting the two;
  wherein the second antenna unit is configured for transmitting transmit data carried by the second antenna cable over the second band and for receiving receive data over both the first band and the second band, said receive data being multiplexed for collective transfer over the second antenna cable to the second RF filter unit; and
  wherein the second RF filter unit is configured to pass the transmit data of only the second communication band on to the second cable for transfer to the second antenna unit and to filter the receive data of the two bands, collectively carried by the second antenna cable, for separate output.

15. The system of claim 14 wherein the antenna units are attached to a base station tower, the filter units are located in a base station enclosure remote from the antenna units, and the cables are routed from the filter units to the antenna units up the base station tower.

16. The system of claim 15 wherein the first and second communication bands are distinct RF bandwidths each designated for transmitting and receiving wireless signals.

17. The system of claim 16 wherein each RF filter unit comprises:

a transmit filter having an output attached to a respective one of said first and second cables and configured for passing a respective one of the transmit data of the first band and the transmit data of the second band on to said respective one of said first and second cables;

a first receive filter sub-unit comprising: a first receive filter circuit for filtering the receive data of the first band, said first receive filter circuit having an input connected to said respective one of said first and second cables; and a first low noise amplifier connected between an output of first receive filter circuit and an output of the first receive filter sub-unit, for amplifying the receive data of the first band; and a second receive filter sub-unit comprising: a second receive filter circuit for filtering the receive data of the second band, said second receive filter circuit having an input connected to said respective one of said first and second cables; and a second low noise amplifier connected between an output of second receive filter circuit and an output of the second receive filter sub-unit, for amplifying the receive data of the second band.

18. The system of claim 16 wherein:

the first antenna unit includes a first antenna configured for transmitting transmit data and receiving receive data over the first band, a second antenna configured for receiving receive data over the second band, and at least one of a first diplexer unit and a first tower mounted amplifier (TMA) interconnecting the first and second antennas to the first antenna cable; and the second antenna unit includes a third antenna configured for transmitting transmit data and receiving receive data over the second band, a fourth antenna configured for receiving receive data over the first band, and at least one of a second diplexer unit and a second TMA interconnecting the third and fourth antennas to the second antenna cable.

19. The system of claim 14 wherein:

each RF filter unit comprises:
  a transmit filter having an output attached to a respective one of said first and second cables and configured for passing a respective one of the transmit data of the first band and the transmit data of the second band on to said respective one of said first and second cables;
  a first receive filter sub-unit comprising: a first receive filter circuit for filtering the receive data of the first band, said first receive filter circuit having an input connected to said respective one of said first and second cables; and a first low noise amplifier connected between an output of first receive filter circuit and an output of the first receive filter sub-unit, for amplifying the receive data of the first band; and
  a second receive filter sub-unit comprising: a second receive filter circuit for filtering the receive data of the second band, said second receive filter circuit having an input connected to said respective one of said first and second cables; and a second low noise amplifier connected between an output of second receive filter circuit and an output of the second receive filter sub-unit, for amplifying the receive data of the second band;

the first antenna unit includes a first antenna configured for transmitting transmit data and receiving receive data over the first band, a second antenna configured for receiving receive data over the second band, and at least one of a first diplexer unit and a first tower mounted amplifier (TMA) interconnecting the first and second antennas to the first antenna cable; and the second antenna unit includes a third antenna configured for transmitting transmit data and receiving receive data over the second band, a fourth antenna configured for receiving receive data over the first band, and at least one of a second diplexer unit and a second TMA interconnecting the third and fourth antennas to the second antenna cable.

* * * * *